United States Patent [19]
Crockett et al.

[11] Patent Number: 5,365,036
[45] Date of Patent: * Nov. 15, 1994

[54] FLUX CORED GAS SHIELDED ELECTRODE

[75] Inventors: Dennis D. Crockett, Mentor; Ronald J. Gordish, Kirtland; Karl J. Kulikowski, Cleveland Hts.; Robert P. Munz, Jefferson, all of Ohio

[73] Assignee: The Lincoln Electric Company, Cleveland, Ohio

[*] Notice: The portion of the term of this patent subsequent to Aug. 3, 2010 has been disclaimed.

[21] Appl. No.: 977,086

[22] Filed: Nov. 16, 1992

Related U.S. Application Data

[63] Continuation-in-part of Ser. No. 902,020, Jun. 22, 1992, Pat. No. 5,233,160.

[51] Int. Cl.⁵ .............................................. B23K 35/22
[52] U.S. Cl. ...................... 219/137 WM; 219/145.22; 219/146.22; 219/146.3
[58] Field of Search ...................... 219/145.22, 146.22, 219/146.1, 146.3, 146.31, 146.24, 137 WM

[56] References Cited

U.S. PATENT DOCUMENTS

| | | | |
|---|---|---|---|
| 3,558,851 | 1/1971 | Oku | 219/146 |
| 3,702,390 | 11/1972 | Blake et al. | 219/137 WM |
| 4,510,374 | 4/1985 | Kobayashi | 219/146 |
| 4,723,061 | 2/1988 | Munz | 219/146 |
| 4,833,296 | 5/1989 | Crockett et al. | 219/145.22 |
| 5,095,191 | 3/1992 | Bushey | 219/137 |
| 5,233,160 | 8/1993 | Gordish et al. | 219/137 WM |

OTHER PUBLICATIONS

Appln. Serial No. 902,020, filed Jun. 22, 1992.

*Primary Examiner*—Clifford C. Shaw
*Attorney, Agent, or Firm*—Vickers, Daniels & Young

[57] ABSTRACT

A cored electrode for gas shielded arc welding to deposit a weld metal bead, where the electrode has a core of fill material surrounded by a ferrous tube with the fill material having alloying agents and oxide fluxing ingredients including, by weight of fill material, 40–60% titanium dioxide, 0.3–0.5% boron oxide, and 1.0–5.0% aluminum powder, with the aluminum powder having a higher affinity for oxygen than the oxide fluxing ingredients and with the amount of aluminum powder selected to produce 0.02–0.08% titanium, less than 0.002% boron and less than 0.10% aluminum in the weld metal.

31 Claims, 2 Drawing Sheets

FLUX CORED GAS SHIELDED ELECTRODE

This application is a continuation-in-part of prior co-pending application Serial No. 902,020, filed Jun. 22, 1992, owned by the assignee of this application, now U.S. Pat. No. 5,233,160.

The invention relates to the art of arc welding using consumable steel electrodes and more particularly to an improved flux cored gas shielded electrode.

INCORPORATION BY REFERENCE

As background information, prior application Serial No. 902,020, filed Jun. 22, 1992, now U.S. Pat. No. 5,233,160 is incorporated by reference herein as background information. The prior co-pending application of assignee is directed toward a flux cored electrode of the type used with shielding gas that employs a small amount of aluminum powder in the core of the electrode to reduce fume created during the arc welding process. The powdered aluminum reacts with other constituents in the core material and sheath of the electrode in the area or reaction zone defined as the arc surrounded by the shielding gas. The reaction zone is between the electrode and molten metal weld bead. During development of a novel flux cored electrode having reduced fume characteristics, a more general invention in gas shielded flux cored electrode technology was made. This novel advance in the art of flux cored electrodes is the subject of the present invention. The prior application contains background information and certain aspects of the present invention which need not be repeated.

Oku 3,558,851 is incorporated by reference herein as background information. Ferro-aluminum, in minor amounts, is added to the fill material as a strong deoxidizing ingredient. The small amount of ferro-aluminum or aluminum powder is used to kill the steel of the weld bead and does not react in the arc zone above the molten metal of the weld bead. The amounts of ferro-aluminum in this patent are substantially less than found necessary for practicing the present invention. This patent does not teach the advantage of using aluminum for the purposes of reducing titanium dioxide and/or boron oxide for alloying purposes, nor is the aluminum in the electrode of the Oku patent of sufficient amount to perform the nitrogen removing function of the present invention.

Kobayashi U.S. Pat. No. 4,510,374 relates to the use of a low carbon sheath for an electrode to be used in a shielded arc welding process. Again, aluminum is mentioned as a deoxidizer which is common practice; however, the aluminum employed in this prior patent is in the form of retro-aluminum or aluminum powder for alloying purposes. In addition, there is no teaching of the amount of aluminum necessary for performing the function of the present invention wherein the aluminum powder reacts above the molten metal in the weld metal to perform a reduction function in a location removed from the molten metal. In this prior patent, the ferro-aluminum or aluminum powder enters the weld metal and is then used as a deoxidizer. This action creates aluminum oxide which must float to the surface of the weld bead for inclusion in the slag over the weld bead. The present invention employs aluminum powder for a chemical reaction above the weld bead at a time prior to the aluminum entering the weld bead itself. Thus, a chemical reduction effect takes place by the action of the aluminum in the reaction zone outside the weld bead. Moreover, the aluminum in the present invention is available for nitrogen scavenging of the weld metal.

Munz U.S. Pat. No. 4,723,061 is directed to a flux cored electrode using aluminum oxide for the purpose of controlling the physical properties of the molten slag over the weld bead. The aluminum oxide is for slag forming purposes only. A high amount of aluminum oxide was used as the slag viscosity controlling constituent contained in the fill material. Aluminum powder could be provided for oxidation and used to control the slag. This patent does not teach the amount of aluminum used to create aluminum oxide since provision of aluminum oxide was the only objective explained in this prior patent. There is no example of the use of aluminum powder in any proportion to obtain any particular function in the gas shielded electrode other than formation of aluminum oxide.

Bushey 5,095,191 discloses a gas shielded arc welding electrode using cesium. A certain amount of aluminum is suggested as one of many alloying elements; however, there is no teaching of the manner by which aluminum can be employed for any particular use, except for alloying purposes.

BACKGROUND OF INVENTION

For many years, aluminum alloying systems have been successfully used in self shielded flux cored welding electrodes to produce weld deposits with exceptional impact and strength properties. Exceptional mechanical properties can be developed when using self shielding flux cored welding electrodes when the deposited weld metal has an aluminum content of approximately 0.5%. It is believed that the aluminum forms a nitride which precipitates in the metal of the weld bead and enhances the mechanical properties of the weld metal. The aluminum is employed for alloying with the weld metal to remove oxygen and free nitrogen from the solidified weld bead. In the well developed specialized technology used to create self shielded flux cored welding electrodes, the use of aluminum to alloy with the weld bead metal has resulted in a weld bead alloy about 0.5 to 1% aluminum. With this alloy composition, the aluminum nitride is formed and free nitrogen is not generally available. As the amount of alloyed aluminum was decreased in the weld metal, it was found that the porosity of the weld metal increased to decrease the strength and impact characteristics of the weld joint. Consequently, it was believed that when aluminum was used as an alloying agent for the weld metal in self shielded welding, it was necessary to create more than 0.5% aluminum in the weld metal. This use of an aluminum for the controlling properties of the weld bead allowed the aluminum to interact within the weld bead as an alloying constituent. Since the electrode was self shielding, the gases created by the arc expelled air and prevented oxygen and nitrogen from ingressing into the molten metal due to the rapid egress of gas created by the arc. Thus, there was no reaction zone in the arc in which the aluminum was primarily reacted with other constituents. The aluminum entered the weld bead and alloyed with the metals of the weld bead.

When using gas shielded flux cored arc welding electrodes as contemplated by the present invention, deoxidation of the weld metal or control of nitrogen in the weld metal is not primarily dependent on aluminum. These particular electrodes are primarily carbon-manganese-silicon type systems which rely on the gas shielding to prevent nitrogen contamination of the weld pool metal by excluding the surrounding atmosphere. Manganese and silicon are used as alloying agents for deoxidizing or killing the metal in the weld metal bead. The use of aluminum of any type in gas shielded electrodes, which is not a concept employed in practice, has merely been suggested as one of many possible means of alloying the weld metal. There has been no suggestion of using aluminum for reaction in the reaction zone of the arc above the weld metal pool in an electric arc welding process of the type using shielding gas. Consequently, electrodes used in arc welding with shielding gas intentionally avoided aluminum in the weld metal deposit believing that this lack of aluminum in the deposit would assist in providing better mechanical properties. In the past, the use of aluminum alloying agent for a gas shielded electrode was not used in practice, and the weld metal generally had no aluminum in the weld metal. This was believed to assure better strength and impact characteristics. There was no effort to use aluminum as an alloying agent in the weld bead when using shielded gas type of flux cored electrodes.

THE INVENTION

It has been recently discovered that small amounts of aluminum in powder form in the core of an electrode of the type having no internal shielding gas was instrumental in reducing the fume level and improving the arc action at high wire feed speeds. The use of up to about 1.0–2.0% aluminum powder in the core was found to modify the traditional carbon-manganese-silicon systems to reduce fume. It has now been found that, contrary to conventional wisdom in the shielded flux cored electrode technology, aluminum powder in the core of the electrode can result in tensile strength and Charpy impact characteristics approaching those levels obtainable by solid wire welding. This is an ultimate objective of the flux cored electrode technology- Heretofore, flux cored electrodes had advantages of convenience, but sacrificed mechanical properties. The objective of approaching properties of solid wire welding is approached by the use of controlled amounts of aluminum powder in the core of a gas shielded flux cored arc welding electrode in accordance with the present invention. Consequently, the present invention relates to the use of aluminum in a conventional carbon manganese-silicon system for a gas shielded flux cored electrode, in which it is highly reactive in the arc above the weld metal to perform the desired functions, before any residual amount enters the weld metal. It has been found that the aluminum in the arc reduces titanium dioxide and boron oxide to allow slight amounts of titanium and boron metals to enter the molten pool of weld metal as alloying elements. It also seems to decrease the total nitrogen in the weld deposit when compared to the C—Mn—Si—Ti system. Sufficient amounts of aluminum, defined as a percentage in this application, creates a certain amount of residual aluminum in the weld metal. This aluminum constituent of the weld metal in the amounts caused by use of the present invention is highly beneficial. This residual aluminum is used to reduce the free nitrogen in weld metal. This is an advantage since notch toughness and CTOD properties of the weld deposit metal deteriorate rapidly as the free nitrogen in the weld metal increases.

By use of the present invention, the aluminum reduces the titanium dioxide and/or the boron oxide for the purposes of creating a certain amount of elemental titanium and/or boron in the weld metal. The advantages of titanium and boron are well known in the technology of gas shielded flux cored electrodes. The invention is also useful in TiBor type electrodes. In addition, the invention allows the combination of boron oxide and a controlled amount of aluminum powder to control the actual boron in the weld metal. This concept is superior to the use of boron as an alloy in the steel sheath of the electrode and is easier to control than the use of elemental boron in the core of the electrode.

In the present invention, one of the most important features is the reduction of total nitrogen in the weld metal by the use of aluminum when compared to the conventional C—Mn—Si—Ti system for a given nitrogen content in the cored wire. This is accomplished either by reducing the nitrogen intake in the weld metal by reduction of nitrogen oxide formation in the arc or by helping nitrogen evolution from the weld metal by preventing iron oxide formation on the weld metal surface.

Moreover, in the present invention, the residual aluminum in the weld metal is less than 0.1% by weight of the weld metal. This controlled amount of aluminum in the weld metal is sufficient to reduce the amount of free nitrogen in the weld bead. The reduction of total and free nitrogen in the weld metal enhances its mechanical properties. As an explanation of this concept, details of the states of nitrogen in the weld metal can be helpful. Total nitrogen in the weld bead represents nitrogen in the following forms: Free, interstitial nitrogen that is dispersed or collected around grain boundaries, nitrogen in the form of simple or complex nitrides, and occluded nitrogen in the molecular gaseous state contributing to the porosity of the weld metal. In gas shielded systems, total nitrogen in the weld metal tends to be quite low due to shielding of the arc and the weld metal from the atmosphere. By the use of the present invention, aluminum in the core of electrode in the amount of 1 to 5 wt%, reduces total nitrogen in the weld deposit even further. This precludes the existence of occluded nitrogen in the weld metal. Therefore, total nitrogen in the weld metal in this system is the sum of free nitrogen and nitrogen in the form of nitrides, the relative amounts of which are determined by the amount of available nitride formers. Since titanium and boron are strong nitride formers, some of the nitrogen would be fixed as titanium nitride and boron nitride. The remaining nitrogen is present as free nitrogen which is available to combine with aluminum. By the use of the present invention, a slight amount of aluminum which is less than 0.1% of the weld metal and preferably less than 0.03% of the weld metal is in the deposited metal. This aluminum reacts with the free nitrogen and forms aluminum nitride. Since the amounts of aluminum and nitrogen in the weld metal are low, these aluminum nitride particles develop late, presumably in the solid weld metal. In any event, aluminum decreases free nitrogen in the weld metal. Moreover, the amount of these nitride inclusions in the weld metal are low. Both these factors improve the impact properties of the weld metal.

In accordance with the present invention, the residual aluminum in the weld metal is less than 0.10% by weight of the weld metal. This controlled amount of aluminum in the weld metal is sufficient to reduce the amount of free nitrogen in the weld bead for the purposes of enhancing the physical properties of the weld bead. As an explanation of this concept, details of nitrogen formation can be helpful. Nitrogen can be present in the weld bead as free, interstitial nitrogen that is dispersed or collected around grain boundaries. Also nitrogen can be present as nitrides in either simple or complex precipitated phases. In addition, occluded nitrogen can be present in the molecular gaseous state which contributes to the porosity of the weld metal. By the use of the present invention, a slight amount of aluminum which is less than 0.10% of the weld metal and preferably less than about 0.03% of the weld metal is in the deposited metal. This amount of aluminum has been found to produce superior mechanical properties in the weld deposit apparently through the further reduction of free nitrogen by the formation of stable aluminum nitrides.

Since this nitride develops late in the solidification process, the nitrides that form when using the present invention are different than the earlier formed nitrides of a standard carbon-manganese-silicon system. Such nitrides in conventional systems for flux cored electrodes of the type to which the present invention is directed are formed early in the solidification process. This will produce coherent precipitate particles which cause a strain in the lattice of the solidified weld metal which creates forces that tend to fracture the crystalline structure of the weld metal. Consequently, the amount of energy required to break a weld joint of a Charpy V notch impact specimen is substantially increased by use of the present invention because the amount of internal strain energy produced by the incoherent nitrogen precipitates is substantially less than the coherent precipitate particles of the nitride compound realized in conventional carbon-manganese-silicon electrode system.

In accordance with the preferred embodiment of the present invention, titanium dioxide and boron oxide is contained in the core of the electrode. Aluminum powder within the electrode core chemically reacts in the zone created by the arc to reduce the boron oxide and a portion of the titanium dioxide. This allows a controlled amount of titanium and boron to be introduced into the weld metal. The advantages of these two alloying agents for the weld metal is well documented. The present invention has the ability to accurately control the titanium or boron in the weld metal bead by proper selection of the amount of aluminum powder within the core of the electrode. This is a feature of the present invention that is not employed in other gas shielded flux cored arc welding electrodes.

The present invention employs a controlled amount of aluminum powder which is added to the fill of somewhat standard flux cored electrodes. By using the present invention, it has been found that removal of foundry grade ferro-type titanium from an electrode does not decrease the impact properties of the resulting weld metal. These mechanical properties are retained by the use of aluminum powder in the core material. It is believed that the superior mechanical properties are obtained by the present invention because the added aluminum, in a controlled amount, creates the proper levels of titanium and boron in the weld deposit for optimum mechanical properties through a direct reduction of titanium dioxide and boron oxide by the added aluminum. Consequently, metallic titanium, such as ferrotitanium, and metallic boron are not required in the fill material. The aluminum reacts in the zone of the electric arc above the weld metal to yield a controlled amount of titanium and boron for depositing into the weld bead to obtain the desired mechanical characteristics. Residual aluminum content of the weld deposit remains low by using the present invention as long as the fill material in the core has sufficient oxides with a negative free energy more positive than the negative free energy of aluminum oxide. Consequently, the present invention employs a controlled amount of aluminum powder in the core. This powder reacts in the zone above the molten metal pool to reduce titanium oxide or boron oxide or both for alloying of the two elements in the weld bead. The aluminum powder is selected so that the amount of residual aluminum in the weld bead is less than 0.1% by weight of the weld bead metal. This amount of aluminum is sufficient to react with the nitrogen in the weld bead metal to form aluminum nitride. The amount of titanium and boron recovered in the weld bead deposit for a given fill composition of the electrode is proportional to the amount of metallic aluminum powder in the core of the electrode. Increased amounts of aluminum will result in greater recovery of titanium and boron from the titanium dioxide and boron oxide compounds present in the fill material of the electrode. Consequently, the amount of aluminum powder is selected to produce a desired amount of titanium, boron, and residual aluminum in the weld metal. It has been found that the percentage of aluminum powder required in the fill material is approximately 1.0-5.0% by weight of the fill material.

A substantial percentage of aluminum powder is consumed in the reaction zone of the arc, with only a slight amount of aluminum actually entering the weld metal in accordance with the present invention. By using the present invention, the nitrogen content of the weld bead is lower than that realized in conventional electrode systems using carbon-manganese-silicon and titanium. It would appear initially that the addition of aluminum would result in a higher level of deposited nitrogen due to the aluminum nitrides which would be created. However, as mentioned before, aluminum lowers the oxidation potential in the arc. This presumably minimizes the nitrogen oxide formation which reduces nitrogen pickup in the weld. Aluminum also reduces formation of iron oxides on the weld metal surface which helps nitrogen evolution from the weld metal. Residual aluminum combines with free nitrogen remaining in the weld metal to form aluminum nitride. Consequently, the use of the present invention substantially enhances the mechanical properties of the weld bead metal by reducing the total and free nitrogen and having a controlled low amount of aluminum. A substantially high percentage of aluminum is used in the fill material so that the aluminum is available to react above the weld metal pool to reduce titanium or boron or both for alloying purposes with a slight residual aluminum that appears in small quantities in the weld bead metal.

The use of powdered aluminum in the core of a gas shielded flux cored electrode has been found, in low levels, to reduce the fume emission of the electrode. By increasing the amount of aluminum powder to a controlled amount, dependent upon the desired reduction of titanium oxide or boron oxide or both, optimum mechanical properties can be achieved. The amount of titanium and boron within the weld metal is also controlled. Titanium in the weld metal should be in the range of 0.020-0.080% by weight of the weld metal. Preferably the titanium in the weld metal is in the range of 0.025-0.55% by weight of weld metal. The amount of boron should be at least 0.002% by weight of metal and preferably in the range of 0.0025-0.0065% by weight of the metal in the deposit. The selection of aluminum to obtain these desired characteristics of the weld metal bead is an aspect of the present invention.

The use of the aluminum system of the present invention will provide mechanical properties substantially greater than that obtained by conventional alloying systems employing carbon manganese and silicon only. This result is confirmed when comparing the weld bead formed by electrode A as compared to the prior art weld bead identified as example II. The use of the aluminum system of the present invention which results in substantially enhanced mechanical characteristics also has other advantages. As mentioned before, the weld deposit nitrogen using an aluminum system of the present invention is lower than that obtained using conventional systems for a given nitrogen content in the cored wire. This is evidenced when comparing the results obtained by electrode A having sufficient aluminum in the core to deposit aluminum in the weld metal, and prior art example II which did not use aluminum. This data is consistent with the various other electrodes A–E formulated in accordance with the present invention. An advantage of the present invention is the decrease of total nitrogen in the weld metal together with the availability of titanium and boron for alloying in the weld metal from the aluminum reducing titanium dioxide and boron in the reaction zone above the weld metal. It is presumed that the total nitrogen in the weld metal is reduced by the aluminum in the arc zone combining with the available oxygen in this zone. Consequently, the oxygen can not absorb nitrogen to form the nitrogen oxide which is a compound that will create nitrogen in the weld metal. In addition, the oxygen in the reaction zone above the weld metal creates FeO. This oxide forms a layer on the surface of the weld pool. This layer prohibits the evolution of nitrogen from the solidifying weld metal. Consequently, the barrier of iron oxide results in a higher nitrogen content in the weld metal. The use of aluminum of the present invention tends to prevent the formation of iron oxide as a layer or barrier on the surface of the weld pool.

Since the present invention produces a lower nitrogen weld deposit than the conventional system for gas shielded flux cored electrodes, the present invention will result in a welding process which is less sensitive to the loss of shielding gas. In the past, electrodes for use with shielding gas have presented serious problems when the shielding gas has been discontinued. Increased nitrogen is absorbed by the weld metal from the atmosphere. This causes a corresponding decrease of the notch toughness of the weld metal deposit. This deleterious phenomenon is reduced with the use of aluminum powder in the core of the electrode to absorb the nitrogen and oxygen in the arc above the molten metal, thus preventing nitrogen from entering the molten metal even with an inadvertent discontinuation of the shielding gas envelope around the electrode.

The present invention results in a flux cored electrode to be used with shielding gas that obtains the required deposit chemistry as far as titanium and/or boron are concerned, and provides a more consistent weld deposit. In conventional systems, the use of titanium and boron alloying elements in small controlled amounts within the electrode core is accomplished only with extreme care, to prevent segregation and variations in the chemistry of the weld deposit along its length. By using the present invention, the titanium and boron is made available to the weld metal more easily in controlled small amounts which prevent these deleterious effects on the weld metal.

The use of the present invention permits production of the steel sheath for the electrode from continuous cast steels. In the past, such inexpensive steels could not be employed for gas shielded flux cored electrodes because the steel included a certain amount of aluminum and nitrogen. The present invention permits the use of continuous cast steels which are naturally higher in nitrogen content, since the aluminum that is incorporated in the electrode will reduce the total nitrogen intake in the weld metal and fix the residual free nitrogen into innocuous aluminum nitride particles.

A major concern when using gas shielded flux cored electrodes is the resulting high strength levels achieved when the manganese and silicon levels of the deposited metal have been optimized for impact properties. Manganese and silicon in the weld metal result in relatively high strength when used in amounts to create the desired impact properties. This is especially a concern when the electrodes are designed for use with carbon dioxide shielding gas, but are actually used with argon blends of shielding gas. Such blends result in higher strength levels due to higher pickup of manganese and silicon in the weld metal. Consequently, the strength level will be in excess of the desired strength levels for the desired impact properties in the manganese and silicon system. By using the present invention, the strength of the weld metal deposit is significantly lowered in comparison to that produced in the conventional manganese and silicon system. Consequently, if the electrode is designed for carbon dioxide, and argon blends are employed as the shielding gas, the strength will not exceed desired parameters. This characteristic is evidenced when comparing the weld metal deposits by electrode A as compared to the prior art electrode example II. The aluminum content of the core, as controlled in accordance with the present invention, provides a mechanism to limit the strength levels of the deposited weld metal to allow manganese and silicon levels necessary for high impact properties. It is believed that the reduction in the strength level when using the present invention results from a weld deposit with less micro-inclusions than that resulting from a standard conventional carbon-manganese-silicon system. These inclusions serve to retard slip of the internal platelets and increase the strength of the resulting weld metal.

Another advantage of the present invention is the inclusion of aluminum within the core of the electrode, which aluminum reacts early in the welding process to break apart and evolve any moisture bearing materials. Consequently, the electrode is less sensitive to moisture and lubricant contaminants than other electrodes of the type used in gas shielded arc welding. This reduced moisture sensitivity also provides lower hydrogen content for a given moisture content in the electrode. Consequently, the present invention reduces the requirement for electrode baking to drive out moisture.

The aluminum powder in the novel electrode tends to reduce the iron oxide content in the welding fume and, thus, lower the fume level as is described in assignee's prior application, that is incorporated by reference herein.

In accordance with the present invention, there is provided a cored electrode for gas shielded arc welding to deposit a weld metal bead. This novel electrode has a core of fill material surrounded by a ferrous tube. The fill material includes alloying agents and oxide fluxing ingredients together with 1.0–5.0% aluminum powder, wherein the aluminum powder has a higher affinity for oxygen than the alloying agents or oxide flux ingredients of the fill material. The amount of aluminum powder is selected to produce less than 0.10% aluminum in the resulting weld metal. The proper selection of the amount of aluminum powder to produce only a low amount of residual aluminum for alloying allows reduction of nitrogen in the weld metal and deoxidizes the alloying agents in the arc reaction zone above the weld metal.

In accordance with another aspect of the present invention, there is provided 40–60% titanium dioxide in the fill material and the aluminum powder is selected to produce 0.02–0.08% titanium in the weld metal.

In accordance with another aspect of the present invention, the fill material includes boron oxide in the range of 0.3–0.5% by weight of the fill material and the aluminum is selected to produce a weld metal that contains at least 0.002% boron by weight. Preferably, the boron in the weld metal is in the range of 0.0025–0.0065% by weight of the weld metal.

Yet another aspect of the present invention is the provision of a cored electrode wherein the fill material includes both titanium dioxide and boron oxide with the weld metal producing a ratio of titanium to boron in the general range of 9–11:1. This range is preferably approximately 10:1.

In accordance with yet another aspect of the present invention, there is provided a method of gas shielded arc welding with a cored electrode to deposit a weld metal bead. The method comprises the steps of using an electrode having a core of fill material surrounded by a ferrous tube. The fill material includes, by weight of fill material, 40–60% titanium dioxide and 1.0–5.0% aluminum powder. The amount of aluminum powder is selected to produce 0.02–0.08% by weight titanium and less than 0.10% by weight aluminum in the weld metal.

In accordance with the broadest aspect of the present invention in the area of a novel method, a method is provided for gas shielded arc welding with a cored electrode to deposit a weld metal bead. This method comprises the steps of using an electrode having a core of fill material surrounded by a ferrous tube. The fill material includes, by weight of fill material 1.0–5.0% aluminum powder and selecting the amount of aluminum powder to produce less than 0.10% aluminum in the weld metal.

The invention further involves a method of arc welding with a shielding gas to deposit a weld metal bead. This method comprises the steps of providing an electrode having a ferrous tube with a core of fill material including metal oxides and 1.0–5.0% aluminum powder by weight of the fill material; creating an arc between the weld metal bead and an electrode for melting the ferrous tube in a reaction zone in the electric plasma or arc between the electrode and the metal bead; and, introducing the aluminum powder into the arc reaction zone to reduce the metal oxides in the reaction zone with a portion or residual amount of the aluminum entering the metal bead to form an aluminum alloy of less than 0.10% of the aluminum by weight of the metal in the weld bead.

In accordance with still a further aspect of the present invention, the aluminum in the weld bead when practicing the present invention is in the range of 0.01–0.05% by weight of the metal of the weld bead.

The primary object of the present invention is the provision of a flux cored electrode used in gas shielded arc welding, which electrode has strength and impact characteristics approaching those of solid wire used in arc welding.

Another object of the present invention is the provision of a flux cored arc welding electrode, which electrode uses powdered aluminum in the core in an amount to react within the electric arc or plasma zone to create alloying metal, while also depositing a small controlled, residual amount of aluminum within the weld bead itself.

A further object of the present invention is the provision of a flux cored shielding gas electrode, as defined above, which electrode controls the amount of titanium or boron or both in the weld bead alloying system.

Yet another object of the present invention is the provision of a flux cored electrode, as defined above, which flux cored electrode can use a sheath made from continuous cast steel and need not require substantial baking for removal of moisture.

Still a further object of the present invention is the provision of a flux cored gas shielded electrode, as defined above, which electrode decreases the amount of nitrogen in the weld bead without increasing the amount of aluminum beyond small amounts, which small amounts do not deleteriously affect the grain characteristics of the weld metal.

Another object of the present invention is the provision of a novel method of gas shielded arc welding, which method results in a weld bead having a low amount of nitrogen and a controlled minor amount of residual aluminum with controlled alloying of the weld metal with titanium or boron, or both.

These and other objects and advantages will become apparent from the following description utilizing the drawings herein.

PREFERRED EMBODIMENT

Figure 1:
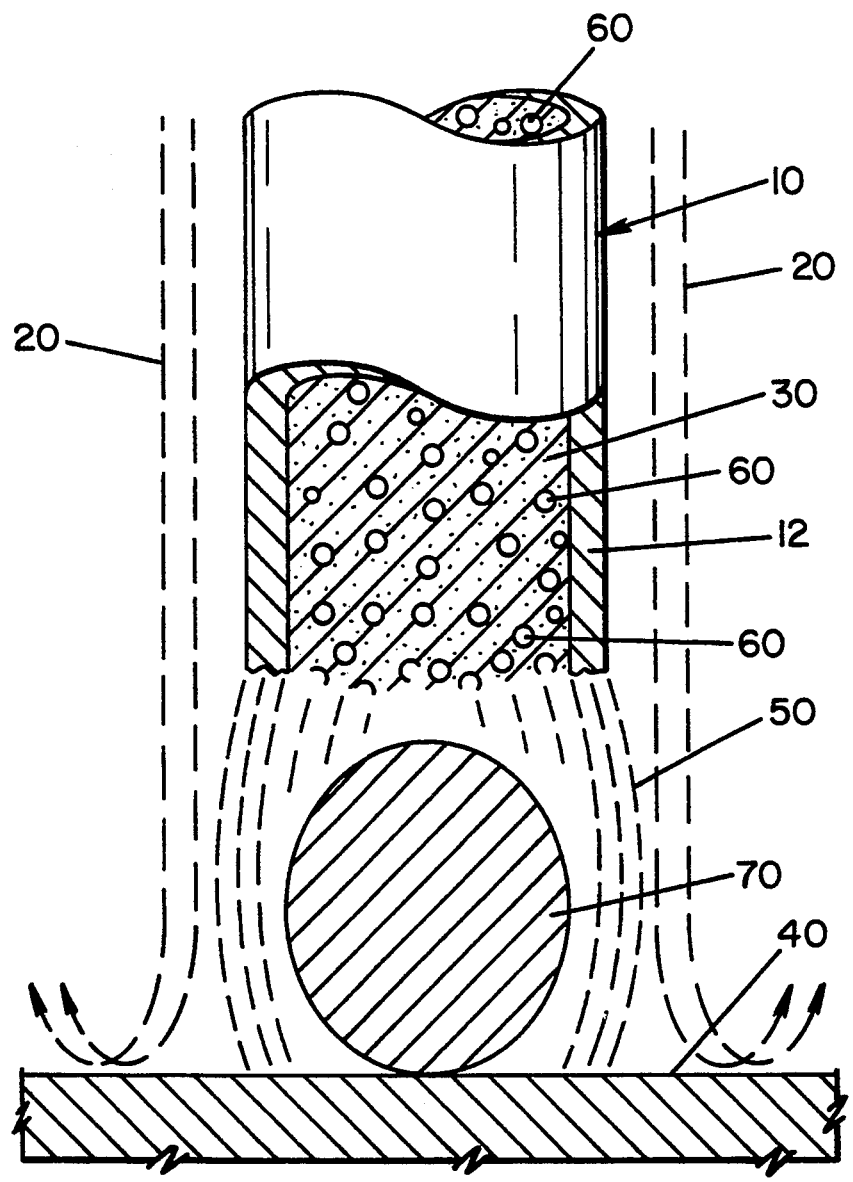
FIG. 1 is a schematic, cross-sectional view of an electrode constructed in accordance with the preferred embodiment of the present invention and illustrating the reaction zone instrumental in the practice of the present invention; and, FIG. 2 is a graph showing the relationship between decreasing the amount of nitrogen in the weld metal and the impact characteristics of the weld bead metal or joint.

Referring to the drawings wherein the showings are for the purpose of illustrating the preferred embodiment only and not for the purpose of limiting same, FIG. 1 shows a consumable electrode 10 having an outer steel sheath 12 formed from low carbon steel preferably having a carbon content of less than 0.07% by weight of the steel in the sheath. Electrode 10 is used with shielding gas 20, preferably carbon dioxide for lowest cost; however, blends of shielding gas with components such as oxygen, helium, argon, etc. can be employed. Within core 30 of electrode 10, there is provided particulated material in the form of alloying agents, fluxing agents, and other constituents necessary to form the proper slag over the weld bead or molten metal pool 40 when an arc 50 is created between the end of electrode 10 and the weld metal pool 40. In accordance with the preferred embodiment of the invention, core 30 includes aluminum powder schematically illustrated as particles 60 dispersed throughout the core and having a weight of 1.0–5.0% of the fill material constituting core 30. Metallic aluminum from core 30 reacts in arc 50 in a zone indicated as reaction zone 70. In accordance with the invention, the amount of aluminum is selected to reduce the titanium dioxide or boron oxide, or both, to release a certain amount of titanium and boron for alloying in the metal of weld bead 40. Sufficient amount of aluminum powder is placed into core 30 so that there is a small amount of residual aluminum that alloys with the weld metal in molten pool 40. In practice, the amount of aluminum is selected to produce less than 0.10% aluminum in the weld metal of pool 40. Consequently, aluminum powder in the range of 1.0–5.0% is used to directly react with the core material in zone 70. This chemical and thermal action releases certain alloying agents, such as titanium and boron, as well as allowing a minor amount of residual aluminum to be available for alloying, nitrogen removal and reaction with dissolved oxygen in the weld metal.

Figure 2:
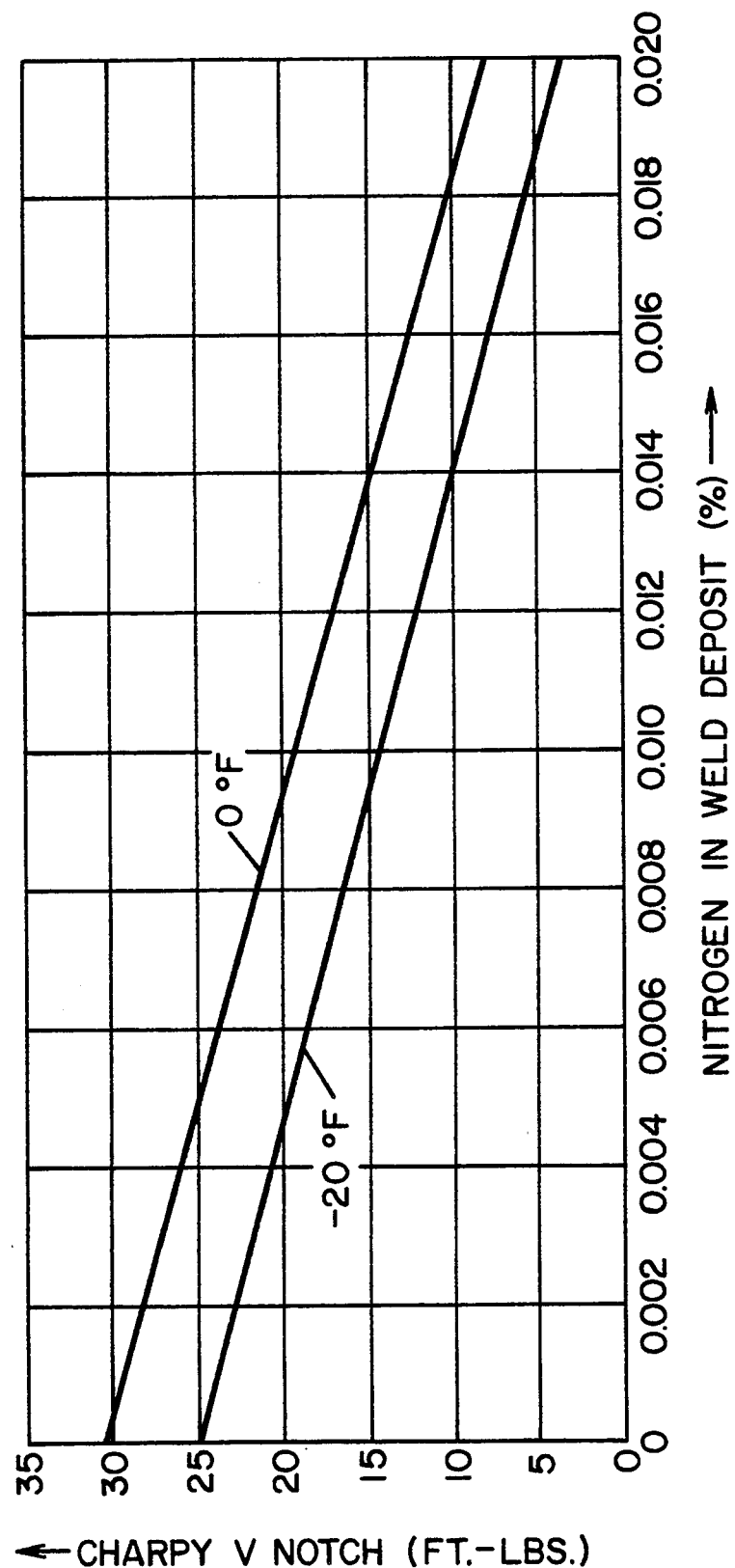

It has been found that the aluminum in the core material reduces the total and free nitrogen in the weld metal. As is known, nitrogen in the weld metal affects the impact characteristics of the weld metal. FIG. 2 illustrates this concept wherein increased amounts of total nitrogen in the weld deposit decreases the Charpy V notch strength of the weld metal bead. Aluminum in the core material reduces the oxygen potential in zone 70, reducing nitrogen oxygen formation and, hence, nitrogen pickup in the weld metal. Residual aluminum provided in accordance with the present invention from the reaction in arc zone 70 enters the weld metal when it is molten and combines with free nitrogen and aluminum nitride is formed. Thus, most of the nitrogen in the weld metal is in the fixed nitride form. Consequently, the aluminum and nitrogen have no substantive deleterious effects upon the strength and impact characteristics of the weld metal when using the present invention.

The present invention employs a controlled amount of aluminum powder in a carbon-manganese-silicon electrode system. This aluminum reduces titanium dioxide, which is the preferred fluxing constituent of the electrode. The amount of aluminum controls the amount of titanium reduced and deposited in the weld metal. This amount of titanium is relatively small to give about 0.02–0.08% titanium by weight of the weld metal. Also, the a powder reduces boron oxide included in core 30 to provide a controlled amount of boron in the weld metal. Only a small amount of boron is required; thus, only a small amount of boron oxide is placed into the core 30. This amount is in the range of 0.30–0.50% by weight of the fill. There is enough aluminum to give the desired titanium and/or boron in the weld metal. In addition, aluminum reduces the oxidizing potential of the arc atmosphere in zone 70. As a result, for reasons mentioned before, nitrogen can not be absorbed effectively from the atmosphere. Zirconium metal could be employed for removing oxygen from the weld metal. However, a substantial amount of zirconium would be required, and control of titanium and boron in the weld metal would become difficult. In addition, the resulting oxide would not enhance the slag characteristics to the extent accomplished by aluminum oxide.

It has heretofore been believed that aluminum could not be used in a gas shielded welding electrode of the flux cored type without decreasing the mechanical properties of the resulting deposited weld metal. When an electrode especially formulated for use with external shielding gas is employed, it has heretofore been realized that excess, residual aluminum in the elemental form in the weld metal produced undesirable microstructures. However, by this invention, this problem is resolved in a unique manner. Residual aluminum consists of uncombined, free aluminum and combined aluminum in the oxide form. It is the intent of the present invention to leave a certain amount of residual aluminum in the weld metal by careful control of the aluminum amount in the core. In accordance with this invention, the weld metal has less than 0.1% aluminum and, preferably, less than about 0.05% aluminum. The part of this residual aluminum that is free (not combined with oxygen), combines with the existing free nitrogen forming aluminum nitride. Therefore, the amount of elemental aluminum in the weld metal is reduced, thereby eliminating undesirable microstructures. The amount of free nitrogen in the weld metal is also reduced. Consequently, the deleterious effects of both excess elemental aluminum and free nitrogen in the weld metal are avoided.

When using the present invention, selection of a controlled amount of aluminum powder within the core is novel. Aluminum powder is less than 0.10% by weight of the weld metal and preferably less than 0.05% aluminum in the weld metal. The aluminum in the core is in the form of powdered metallic aluminum so that it reacts directly and immediately with the constituents of core 30 in the reaction zone 70. Ferro-aluminum and other aluminum alloys react after entering the molten metal pool 40. These alloys generally do not react in zone 70, as anticipated by the present invention. The major use of the present invention is with a titanium dioxide flux cored consumable electrode; however, the invention can also be employed in a flux cored electrode where the core is basic. The aluminum powder provides uniformity in the resulting weld metal, since it reduces the oxides, reduces the oxygen and, thus, reduces the nitrogen in the weld bead. When using titanium dioxide, the amount of aluminum is selected to produce the desired amount of titanium in the weld metal. In essence, at least 1.0% aluminum is added to the electrode core and less than 0.10% is deposited in the weld metal. It has been found that the resulting electrode is somewhat insensitive to moisture and inadvertent loss of shielding gas.

In reaction zone 70, the aluminum powder removes a majority of the oxygen. Consequently, nitrogen oxide can not be formed. Aluminum nitride is formed in the weld metal when using the present invention. Consequently, most of the aluminum in the weld metal is generally in the form of aluminum nitride and aluminum oxide and not elemental aluminum.

The aluminum powder is primarily useful in a TiBor type flux cored electrode specially designed for use with a shielding gas. This is a specialized technology. The combination of titanium and boron in the weld metal reduces the amount of proeutectoid ferrite at the austenite grain boundaries. In addition, titanium produces fine acicular ferrite in the prior austenite grains. The titanium, boron and aluminum reduce the free nitrogen in the system. Thus, titanium, boron and aluminum, which results from the use of the present invention, all contribute to an alloying system with improved strength and impact characteristics. The preferred embodiments of the present invention are illustrated as electrodes A–E shown with flux cored electrodes that employ nickel. Nickel improves ductility at colder temperatures; however, it is not essential in the practice of the present invention. The nickel content of the electrodes A-E of the preferred embodiments of the present invention are electrodes used in welding where nickel is desired; however, other alloying agents could be employed in the present invention.

In the past, TiBor electrodes of the flux cored gas shielded type have contained a small amount of boron in the resulting weld metal. The boron can be provided in the weld metal by various mechanisms. In accordance with an aspect of the invention, boron is included in core 30 as boron oxide. It is reduced by the metallic aluminum powder in the core to allow subsequent alloying of boron in the weld bead metal. The boron shifts the primary ferrite C curve to the right as is well known. The aluminum forms nitrides and oxides. Titanium protects boron from oxidation at the grain boundaries. Boron is a nitride former, but titanium is more capable than either boron or aluminum of forming a nitrogen compound. But aluminum is a stronger deoxidizer, and, herein lies the benefit of using it in this system. Aluminum can reduce NO formation in the arc which reduces nitrogen intake in the weld metal. Aluminum can also help the evolution of nitrogen from the surface of the weld metal. This feature is facilitated when the iron oxide cannot form on the surface of the weld bead due to the preferred reaction of oxygen with the aluminum powder. Thus, the level of nitrogen in the weld metal decreases with the use of aluminum, in accordance with the present invention. The aluminum nitride in the amount present in the metal also has less deleterious effects than free nitrogen or occluded nitrogen.

The present invention results in a major portion of the aluminum powder forming aluminum oxide in zone 70. This compound is beneficial for controlling the characteristics of the slag. The aluminum powder also controls the amount of titanium and boron that enters into the weld metal. The residual amount of aluminum available from zone 70 is used in the weld metal to combine with the nitrogen to remove free nitrogen from the weld metal by forming stable aluminum nitride particles. The titanium to boron ratio in the weld metal is preferably about 10:1. The ratio, in practice, can be approximately 9-11:1 ratio of titanium to boron. The use of the present invention is advantageous and made possible by the control of the amount of aluminum in core 30 and the realization that aluminum forms nitrogen compounds which are beneficial in controlling the physical characteristics of the weld bead metal.

Prior art flux cored electrodes for arc welding with shielding gas are given below.

EXAMPLE I

| | Impact at −40° F. (ft-lbs) |
|---|---|
| Side A | 73, 67, 65, 70 |
| Root | 47, 51, 56, 55 |
| Side B | 67, 67, 62, 66 |

Weld bead analysis for this example is:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.069 | 1.28 | 0.33 | 0.009 | 0.005 | 0.00 | 0.97 | 0.02 | 0.02 | 0.016 | 0.033 | 0.001 | 0.001 | 0.0033 | 0.007 | |
| Root | 0.088 | 1.32 | 0.33 | 0.008 | 0.006 | 0.00 | 0.88 | 0.03 | 0.02 | 0.014 | 0.035 | 0.001 | 0.001 | 0.0033 | 0.006 | |
| Side B | 0.079 | 1.32 | 0.34 | 0.009 | 0.006 | 0.00 | 0.90 | 0.03 | 0.02 | 0.015 | 0.035 | 0.001 | 0.002 | 0.0033 | 0.007 | |

EXAMPLE II

| | Impact at −40° F. (ft-lbs) |
|---|---|
| Side A | 73, 71, 64, 67 |
| Root | 55, 52, 46, 52 |
| Side B | 59, 49, 66, 58 |

Weld bead analysis for this example is:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.06 | 1.45 | 0.35 | 0.011 | 0.007 | 0 | 1.23 | 0.04 | 0.01 | 0.019 | 0.03 | 0.002 | 0.003 | 0.0037 | 0.007 | |
| Root | 0.067 | 1.47 | 0.35 | 0.011 | 0.007 | 0 | 1.23 | 0.04 | 0.01 | 0.018 | 0.035 | 0.002 | 0.003 | 0.0045 | 0.006 | |
| Side B | 0.041 | 1.45 | 0.36 | 0.012 | 0.007 | 0 | 1.34 | 0.03 | 0.01 | 0.02 | 0.032 | 0.002 | 0.003 | 0.0045 | | |

EXAMPLE III

| | Impact at −40° F. (ft-lbs) |
|---|---|
| Side A | 71, 74, 76, 71 |
| Root | 61, 45, 52, 39 |
| Side B | 84, 81, 82, 90 |

Weld bead analysis for this example is:

| Weld Chemistry | | C | Mn | Si | S | P | Al | Ni | Cr | Mo | V | Ti | Zr | Nb | B | N | O |
|---|---|---|---|---|---|---|---|---|---|---|---|---|---|---|---|---|---|
| V907T1 | Side A | 0.060 | 1.37 | 0.33 | 0.013 | 0.017 | 0.00 | 1.48 | 0.03 | 0.01 | 0.014 | 0.034 | 0.003 | 0.009 | 0.0028 | 0.003 | |
| V907R | Root | 0.069 | 1.43 | 0.35 | 0.013 | 0.017 | 0.00 | 1.52 | 0.03 | 0.01 | 0.015 | 0.034 | 0.003 | 0.010 | 0.0048 | 0.004 | |
| V907T2 | Side B | 0.038 | 1.40 | 0.35 | 0.015 | 0.017 | 0.00 | 1.64 | 0.02 | 0.01 | 0.017 | 0.033 | 0.003 | 0.011 | 0.0030 | 0.003 | 0.056 |

The flux ingredients (in weight percent) of the above electrodes of Examples I and II are as follows:

| Ingredients | I | II | III |
|---|---|---|---|
| Na$_2$O | 2.86 | 2.85 | |
| MgO | 3.91 | 3.91 | |
| SiO$_2$ | 4.21 | 4.20 | |
| TiO$_2$ | 53.45 | 53.45 | |
| B$_2$O$_3$ | 0.26 | 0.28 | |
| CaF$_2$ | 1.80 | 2.07 | |
| Al | 0.15 | 0.17 | |
| Si | 2.09 | 2.10 | |
| Ti | 3.13 | 3.49 | |
| Mn | 12.75 | 14.19 | |
| Ni | 5.15 | 8.81 | |

-continued

| Ingredients | I | II | III |
|---|---|---|---|
| Ca | 0.67 | 10.0 | |
| Fe | Bal. | Bal. | |

Example III is a commercial product having no aluminum metal in alloy form or in powder form in the core of the metal sheath forming the electrode.

In a preferred embodiment, the weld bead is laid down between two 2" (50 mm) thick A537 steel plates with the edges of the plates beveled to provide a 50° included angle and the plates positioned so that the lower sharper edges are spaced ¼" (6.4 mm). The plates are preheated to 212° F. (100° C.), and between each weld pass the temperature of the previously deposited bead is allowed to decrease to about 325° F. (163° C.). In nine passes using electrodes A, B, C, D and E described below, the following impact values were obtained:

| | | Impact at −40° F. (ft-lbs) (× 1.3 for cm-Kg) |
|---|---|---|
| Electrode A | Side A | 71, 76, 70, 72 |
| | Root | 50, 50, 52, 48 |
| | Side B | 50, 61, 56, 67 |
| Electrode B | Side A | 61, 60, 56, 54 |
| | Root | 44, 48, 45, 45 |
| | Side B | 56, 55, 54, 72 |
| Electrode C | Side A | 52, 53, 59, 62 |
| | Root | 50, 54, 49, 48 |
| | Side B | 31, 29, 33, 41 |
| Electrode D | Side A | 47, 55, 52, 55 |
| | Root | 47, 45, 46, 43 |
| | Side B | 38, 37, 45, 52 |
| Electrode E | Side A | 66, 75, 72, 73 |
| | Root | 41, 33, 42, 53 |
| | Side B | 32, 50, 68, 63 |

An analysis of the weld bead produced by the preferred embodiment, electrode A, is as follows:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.07 | 1.41 | 0.14 | 0.01 | 0.006 | 0.02 | 0.97 | 0.05 | 0.01 | 0.02 | 0.041 | 0.002 | 0.006 | 0.004 | 0.003 | |
| Root | 0.079 | 1.45 | 0.14 | 0.009 | 0.006 | 0.02 | 0.98 | 0.05 | 0.01 | 0.02 | 0.04 | 0.002 | 0.006 | 0.0053 | 0.003 | |
| Side B | 0.053 | 1.41 | 0.13 | 0.01 | 0.006 | 0.02 | 1.06 | 0.04 | 0.01 | 0.022 | 0.042 | 0.002 | 0.006 | 0.0062 | 0.002 | |

An analysis of the weld bead produced by the preferred embodiment, electrode B, is as follows:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.058 | 1.28 | 0.14 | 0.011 | 0.005 | 0.03 | 1.51 | 0.05 | 0.01 | 0.023 | 0.057 | 0.003 | 0.006 | 0.0024 | 0.004 | |
| Root | 0.075 | 1.15 | 0.14 | 0.010 | 0.006 | 0.03 | 1.35 | 0.05 | 0.0 | 0.021 | 0.057 | 0.003 | 0.005 | 0.0027 | 0.004 | |
| Side B | 0.042 | 1.18 | 0.13 | 0.010 | 0.005 | 0.02 | 1.53 | 0.05 | 0.0 | 0.023 | 0.050 | 0.003 | 0.006 | 0.0028 | | |

An analysis of the weld bead produced by the preferred embodiment, electrode C, is as follows:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.053 | 1.37 | 0.12 | 0.009 | 0.004 | 0.02 | 1.54 | 0.04 | 0 | 0.022 | 0.038 | 0.002 | 0.006 | 0.0022 | 0.004 | |
| Root | 0.062 | 1.32 | 0.12 | 0.008 | 0.004 | 0.02 | 1.44 | 0.04 | 0 | 0.021 | 0.042 | 0.002 | 0.005 | 0.0036 | 0.005 | |
| Side B | 0.036 | 1.3 | 0.11 | 0.011 | 0.004 | 0.02 | 1.59 | 0.03 | 0 | 0.023 | 0.043 | 0.002 | 0.006 | 0.0019 | 0.004 | |

An analysis of the weld bead produced by the preferred embodiment, electrode D, is as follows:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.072 | 1.25 | 0.13 | 0.011 | 0.004 | 0.01 | 1.44 | 0.04 | 0.01 | 0.021 | 0.042 | 0.003 | 0.006 | 0.0042 | 0.004 | |
| Root | 0.084 | 1.27 | 0.12 | 0.009 | 0.005 | 0.01 | 1.35 | 0.04 | 0.01 | 0.019 | 0.038 | 0.003 | 0.005 | 0.0032 | 0.004 | |
| Side B | 0.055 | 1.32 | 0.10 | 0.010 | 0.004 | 0.01 | 1.62 | 0.03 | 0.01 | 0.022 | 0.035 | 0.003 | 0.006 | 0.0027 | 0.004 | 0.066 |

An analysis of the weld bead produced by the preferred embodiment, electrode E, is as follows:

| Weld Chemistry | C | Mn | Si | S | P | Al | Ni | Cr | Mo | V | Ti | Zr | Nb | B | N | O |
|---|---|---|---|---|---|---|---|---|---|---|---|---|---|---|---|---|
| Side A | 0.067 | 1.35 | 0.23 | 0.012 | 0.005 | 0.01 | 1.62 | 0.03 | 0.02 | 0.005 | 0.036 | 0.004 | 0.002 | 0.0036 | 0.004 | |
| Root | 0.078 | 1.30 | 0.22 | 0.011 | 0.005 | 0.01 | 1.47 | 0.03 | 0.01 | 0.004 | 0.037 | 0.004 | 0.001 | 0.0034 | 0.005 | |
| Side B | 0.055 | 1.29 | 0.21 | 0.012 | 0.004 | 0.0 | 1.64 | 0.02 | 0.01 | 0.005 | 0.034 | 0.004 | 0.001 | 0.0034 | 0.004 | |

These test specimens of the present invention were obtained by using the following electrodes where the steel is in the form of a low carbon steel tube (<0.07) and the core of the tube was filled with flux ingredients as follows (in weight percent):

| | A | B | C | D | E |
|---|---|---|---|---|---|
| $Na_2O$ | 1.88 | 1.91 | 1.91 | 2.23 | 2.52 |
| $Cr_2O_3$ | 0.12 | 0.12 | 0.12 | 0.12 | 0.03 |
| $V_2O_5$ | 0.10 | 0.10 | 0.10 | 0.10 | 0.02 |
| $Cb_2O_5$ | 0.08 | 0.08 | 0.08 | 0.08 | 0.02 |
| $SiO_2$ | 2.72 | 2.76 | 2.76 | 3.16 | 3.79 |
| $TiO_2$ | 53.44 | 53.44 | 53.44 | 54.00 | 52.85 |
| $Al_2O_3$ | 0.0 | 0.0 | 0.0 | 0.0 | 0.01 |
| $FeO_x$ | 0.23 | 0.23 | 0.23 | 0.23 | 0.07 |
| $ZrO_2$ | 0.56 | 0.56 | 0.56 | 0.56 | 0.12 |
| $B_2O_3$ | 0.26 | 0.15 | 0.15 | 0.24 | 0.18 |

-continued

|                 | A     | B     | C     | D     | E     |
|-----------------|-------|-------|-------|-------|-------|
| CaF$_2$         | 1.22  | 1.23  | 1.23  | 1.32  | 1.98  |
| MgO             | 0.0   | 0.0   | 0.0   | 0.0   | 3.91  |
| KF              | 0.0   | 0.27  | 0.27  | 0.27  | 0.0   |
| Al              | 3.27  | 3.48  | 3.48  | 2.49  | 1.33  |
| Cr              | 0.04  | 0.03  | 0.03  | 0.03  | 0.03  |
| Mn              | 14.53 | 13.74 | 13.74 | 13.74 | 12.64 |
| Ni              | 8.91  | 8.91  | 8.91  | 8.91  | 8.91  |
| Ca              | 0.0   | 0.0   | 0.0   | 0.0   | 0.67  |
| Si              | 0.0   | 0.01  | 0.01  | 0.01  | 1.22  |
| Zr              | 0.0   | 1.15  | 1.15  | 1.14  | 1.89  |
| Fe              | Bal.  | Bal.  | Bal.  | Bal.  | Bal.  |

Typical welding parameters with the above electrodes were:
a. Electrode 0.045 of an inch in diameter;
b. DC electrode positive polarity;
c. ⅜ inch electrical stickout;
d. Electrode fill 14–17 weight percent of total electrode; and
e. Wire feed speed approximately 275 inches/min.

Electrodes A–E were constructed in accordance with the present invention and used aluminum powder in the core to enhance the physical properties of the weld metal using certain nickel consumable electrodes.

The electrodes used in accordance with the present invention contain various alloying agents such as aluminum, chromium, manganese, nickel, cadmium, silicon, zirconium and iron. Other alloying agents may also be used in the flux system. The various types of alloying agents are limited to only those that have a lower affinity for oxygen or nitrogen than the aluminum power. The aluminum powder is designed to be the primary deoxidizer and denitrider in the flux system to obtain the desired alloy metal precipitation into the weld metal while simultaneously reducing the fume production during welding. Alloying agents, such as magnesium or magnesium alloys, which have a greater affinity for oxygen or nitrogen than the aluminum power, adversely affect and interfere with the aluminum powder reactions occurring within reaction zone 70. The deleterious effects of magnesium, magnesium alloys and/or other alloying agents having a higher affinity for oxygen and nitrogen than aluminum cause increased fume production and increased spattering during welding and/or lower weld bead quality.

The invention has been described with reference to a preferred embodiment and alternatives thereof. It is believed that many modifications and alterations to the embodiments discussed herein will readily suggest themselves to those skilled in the art upon reading and understanding the detailed description of the invention. It is intended to include all such modifications and alterations insofar as they come within the scope of the present invention.

Having thus defined the invention, the following is claimed:

1. A cored electrode for gas shielded arc welding to deposit a weld metal bead, said electrode having a core of fill material surrounded by a ferrous tube, said fill material having alloying agents and oxide fluxing ingredients and including, by weight of fill material, 40–60% titanium dioxide and 1.0–5.0% aluminum powder, with said aluminum powder having a higher affinity for oxygen than said alloying agents and said oxide fluxing ingredients and with the amount of aluminum powder selected to produce 0.02–0.08% titanium and less than 0.10% aluminum in said weld metal.

2. A cored electrode as defined in claim 1 wherein said fill material contains boron oxide in the range of 0.3–0.5% by weight of said fill material with said weld metal containing at least 0.002% boron by weight.

3. A cored electrode is defined in claim 2 wherein the ratio of said titanium to said boron in said weld metal is in the range of 9–11:1.

4. A cored electrode as defined in claim 3 wherein said ratio of titanium to boron is approximately 10:1.

5. A cored electrode as defined in claim 3 wherein said titanium dioxide is in the range of 50–60% by weight of said fill material.

6. A cored electrode as defined in claim 3 wherein said fill material includes silicon dioxide in the range of 2.0–4.5% by weight of said fill material.

7. A cored electrode as defined in claim 6 including at least about 10% manganese alloying agent by weight of said fill material.

8. A cored electrode as defined in claim 7 wherein said manganese alloying agent is in the range of 10–15% by weight of fill material.

9. A cored electrode as defined in claim 7 including nickel as an alloying agent.

10. A cored electrode as defined in claim 9 wherein said nickel is in the range of 8–10% by weight of said fill material.

11. A cored electrode as defined in claim 9 wherein said nickel is in the range of 8–10% by weight of said fill material.

12. A cored electrode as defined in claim 2 wherein said titanium dioxide is in the range of 50–60% by weight of said fill material.

13. A cored electrode as defined in claim 2 wherein said fill material includes silicon dioxide in the range of 2.0–4.5% by weight of said fill material.

14. A cored electrode as defined in claim 2 including at least about 10% manganese alloying agent by weight of said fill material.

15. A cored electrode as defined in claim 14 wherein said manganese alloying agent is in the range of 10–15% by weight of said fill material.

16. A cored electrode as defined in claim 2 including nickel as an alloying agent.

17. A cored electrode as defined in claim 16 wherein said nickel is in the range of 8–10% by weight of said fill material.

18. A cored electrode as defined in claim 1 wherein said titanium dioxide is in the range of 50–60% by weight of said fill material.

19. A cored electrode as defined in claim 1 wherein said fill material includes silicon dioxide in the range of 2.0–4.5% by weight of said fill material.

20. A cored electrode as defined in claim 1 including at least about 10% manganese alloying agent by weight of said fill material.

21. A cored electrode as defined in claim 20 wherein said manganese alloying agent is in the range of 10–15% by weight of fill material.

22. A cored electrode as defined in claim 1 including nickel as an alloying agent.

23. A cored electrode for gas shielded arc welding to deposit a weld metal bead, said electrode having a core of fill material surrounded by a ferrous tube, said fill material having alloying agents and oxide fluxing ingredients and including, by weight of fill material, 0.3–0.5% boron oxide and 1.0–5.0% aluminum powder, with said aluminum powder having a higher affinity for oxygen than said alloying agents and said oxide fluxing ingredients and with the amount of aluminum powder selected to produce at least 0.002% boron and less than 0.10% aluminum in said weld metal.

24. A cored electrode as defined in claim 23 wherein said fluxing oxides include titanium dioxide.

25. A cored electrode as defined in claim 24 wherein said titanium dioxide is in the range of 40-60% by weight of said fill material.

26. A method of gas shielded arc welding with a cored electrode to deposit a weld metal bead, said method comprising the steps of using an electrode having a core of fill material surrounded by a ferrous tube, said fill material including, by weight of fill material, 40-60% titanium dioxide and 1.0-5.0% aluminum powder, the amount of aluminum powder to produce 0.02-0.08% titanium and less than 0.10% aluminum in said weld metal.

27. A method of gas shielded arc welding with a cored electrode to deposit a weld metal bead, said method comprising the steps of using an electrode having a core of fill material surrounded by a ferrous tube, said fill material including, by weight of fill material, 0.3-0.5% boron oxide and 1.0-5.0% aluminum powder, and selecting the amount of aluminum powder to produce at least 0.002% boron and less than 0.10% aluminum in said weld metal.

28. A method of arc welding with a shielding gas to deposit a weld metal bead, said method comprising the steps of providing an electrode having a ferrous tube with a core of fill material including metal oxides and 1.0-5.0% aluminum powder by weight of said fill material; creating an arc between said weld metal bead and said electrode for melting said ferrous tube in a reaction zone between said electrode and said metal bead; and, introducing said aluminum powder into said reaction zone to reduce said metal oxides in said reaction zone with a portion of said aluminum entering said metal bead to form an aluminum alloy of less than 0.03% aluminum weight of said metal in said bead.

29. A cored electrode for gas shielded arc welding to deposit a weld metal bead, said electrode having a core of fill material surrounded by a ferrous tube, said fill material having alloying agents and oxide fluxing ingredients and including, by weight of fill material, 0.3-0.5% boron oxide and 1.0-5.0% aluminum powder, with the amount of aluminum powder selected to produce boron in an amount less than 0.002% and less than 0.10% aluminum in said weld metal.

30. A cored electrode as defined in claim 29 including titanium dioxide as a fluxing ingredient.

31. A cored electrode as defined in claim 30 including 40-65% titanium dioxide.

* * * * *